US011260923B2

(12) United States Patent
Bezeau-Tremblay et al.

(10) Patent No.: US 11,260,923 B2
(45) Date of Patent: Mar. 1, 2022

(54) FOUR-WHEEL OFF-ROAD VEHICLE HAVING AN ANTI-LOCK BRAKING SYSTEM ASSEMBLY

(71) Applicant: BOMBARDIER RECREATIONAL PRODUCTS INC., Valcourt (CA)

(72) Inventors: Antoine Bezeau-Tremblay, Sherbrooke (CA); Christian Nolin, St-Denis-de-Brompton (CA)

(73) Assignee: BOMBARDIER RECEATIONAL PRODUCTS INC., Valcourt (CA)

( * ) Notice: Subject to any disclaimer, the term of this patent is extended or adjusted under 35 U.S.C. 154(b) by 576 days.

(21) Appl. No.: 16/142,734

(22) Filed: Sep. 26, 2018

(65) Prior Publication Data

US 2019/0185080 A1 Jun. 20, 2019

Related U.S. Application Data

(60) Provisional application No. 62/598,797, filed on Dec. 14, 2017.

(51) Int. Cl.
*B60T 1/06* (2006.01)
*B60K 17/348* (2006.01)
(Continued)

(52) U.S. Cl.
CPC ............... *B62D 63/04* (2013.01); *B60G 3/06* (2013.01); *B60K 17/348* (2013.01); *B60T 1/065* (2013.01);
(Continued)

(58) Field of Classification Search
CPC ...... B60K 17/348; B60T 1/065; B60T 8/1706
See application file for complete search history.

(56) References Cited

U.S. PATENT DOCUMENTS 2,335,080 A * 11/1943 Piron ........................ B61C 9/52
 74/424
3,926,065 A * 12/1975 Summers ................ F16H 55/17
 74/424
(Continued)

FOREIGN PATENT DOCUMENTS

DE 102010031140 A1 1/2012
EP 2868958 A1 5/2015
JP 2014148308 A 8/2014

OTHER PUBLICATIONS

Skisea Slovenia, 2018 Can-Am ABS Final, Nov. 10, 2017, retrieved from https://www.youtube.com/watch?v=r7ETjlvj4Vg on May 8, 2019.
Machine translation of JP2014148308A; retrieved from http://translationportal.epo.org/ on Nov. 20, 2018.
Machine translation of DE102010031140A1; retrieved from http://translationportal.epo.org/ on Nov. 20, 2018.

*Primary Examiner* — Thomas J Williams
(74) *Attorney, Agent, or Firm* — BCF LLP

(57) ABSTRACT

An off-road vehicle has two front wheels and two rear wheels, the rear wheels being connected to a spool gear driven by a motor. The vehicle also has a left front brake, a right front brake and a single rear brake. Speeds of left and right front wheels are respectively monitored by left and right front speed sensors. A single sensor monitors a common speed of left and right rear wheels. Two user actuated braking input devices, for example a hand lever and a foot lever, may be used independently or concurrently to provide a braking command. An anti-lock braking system may use speed measurements from the various speed sensors to control selective application of pressure on the left front brake, the right front brake and the rear brake.

15 Claims, 14 Drawing Sheets

(51) Int. Cl.
*B62D 63/04* (2006.01)
*B62K 5/01* (2013.01)
*B60T 8/00* (2006.01)
*B62D 5/04* (2006.01)
*B60T 8/36* (2006.01)
*B60T 8/32* (2006.01)
*B60G 3/06* (2006.01)
*B60T 8/17* (2006.01)
*B60T 8/176* (2006.01)
*B60T 13/16* (2006.01)
*B62D 1/02* (2006.01)
*B60K 23/08* (2006.01)
*B60K 5/00* (2006.01)
*B60T 7/04* (2006.01)
*B60T 7/08* (2006.01)
*B60T 8/1769* (2006.01)

(52) U.S. Cl.
CPC ............... *B60T 8/00* (2013.01); *B60T 8/17* (2013.01); *B60T 8/176* (2013.01); *B60T 8/3225* (2013.01); *B60T 8/3685* (2013.01); *B60T 13/16* (2013.01); *B62D 1/02* (2013.01); *B62D 5/04* (2013.01); *B62D 5/0409* (2013.01); *B62K 5/01* (2013.01); *B60G 2200/142* (2013.01); *B60K 23/08* (2013.01); *B60K 2005/003* (2013.01); *B60K 2023/0825* (2013.01); *B60T 7/04* (2013.01); *B60T 7/08* (2013.01); *B60T 8/1769* (2013.01); *B60T 13/161* (2013.01); *B60T 2270/10* (2013.01); *B60T 2270/12* (2013.01); *B60Y 2200/124* (2013.01)

(56) References Cited

U.S. PATENT DOCUMENTS

| | | | | |
|---|---|---|---|---|
| 4,786,075 | A * | 11/1988 | Takahashi | B60G 3/24 180/254 |
| 4,815,338 | A * | 3/1989 | Holan | B60K 17/20 74/417 |
| 4,953,670 | A * | 9/1990 | Chemelewski | B60T 8/171 188/181 A |
| 5,070,745 | A * | 12/1991 | Lindsey | B60K 17/20 74/665 GB |
| 6,203,464 | B1 * | 3/2001 | Ishikawa | F16H 48/08 475/150 |
| 6,746,404 | B2 * | 6/2004 | Schwartz | A61B 5/0031 128/898 |
| 6,883,630 | B2 * | 4/2005 | Morin | B60T 1/062 180/244 |
| 8,086,382 | B2 * | 12/2011 | Dagenais | B60G 17/0157 701/70 |
| 2002/0088661 | A1 | 7/2002 | Gagnon et al. | |
| 2003/0015916 | A1 * | 1/2003 | Sakamoto | B60T 8/4072 303/137 |
| 2005/0146207 | A1 * | 7/2005 | Wagner | B60T 8/1706 303/9.64 |
| 2005/0228568 | A1 | 10/2005 | Hack et al. | |
| 2005/0253353 | A1 * | 11/2005 | Yamamura | B60G 3/20 280/124.135 |
| 2006/0170280 | A1 * | 8/2006 | Nakayama | B60T 8/4081 303/9.62 |
| 2013/0069337 | A1 * | 3/2013 | Person | B60K 17/16 280/124.156 |
| 2019/0184955 | A1 * | 6/2019 | Nolin | B60T 13/167 |

* cited by examiner

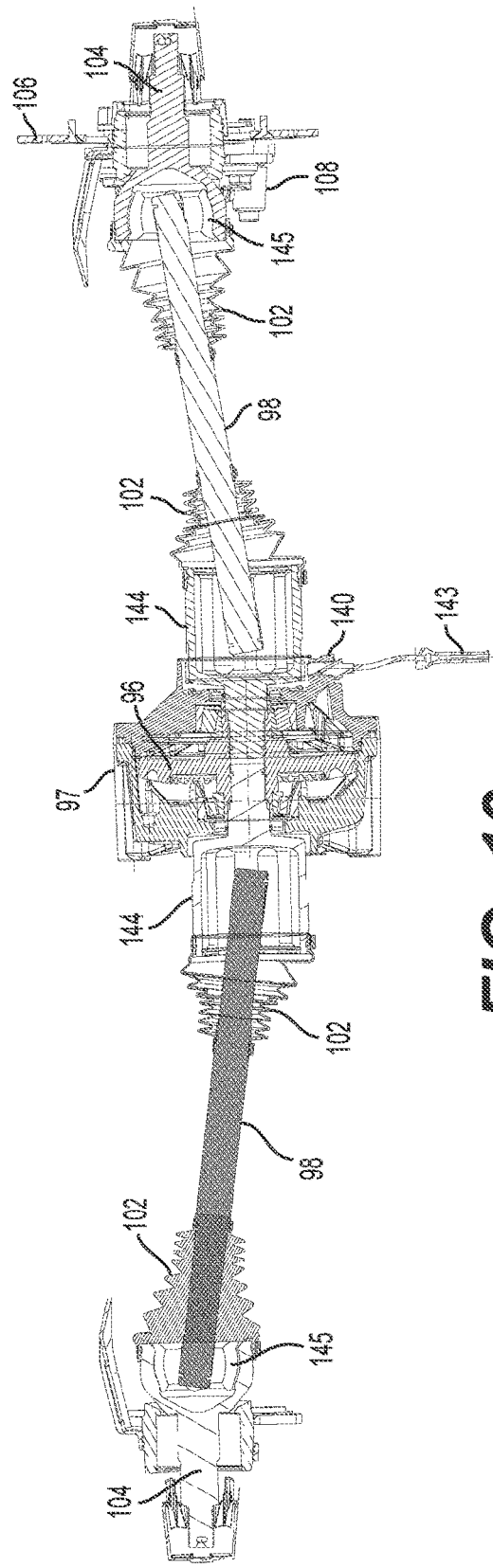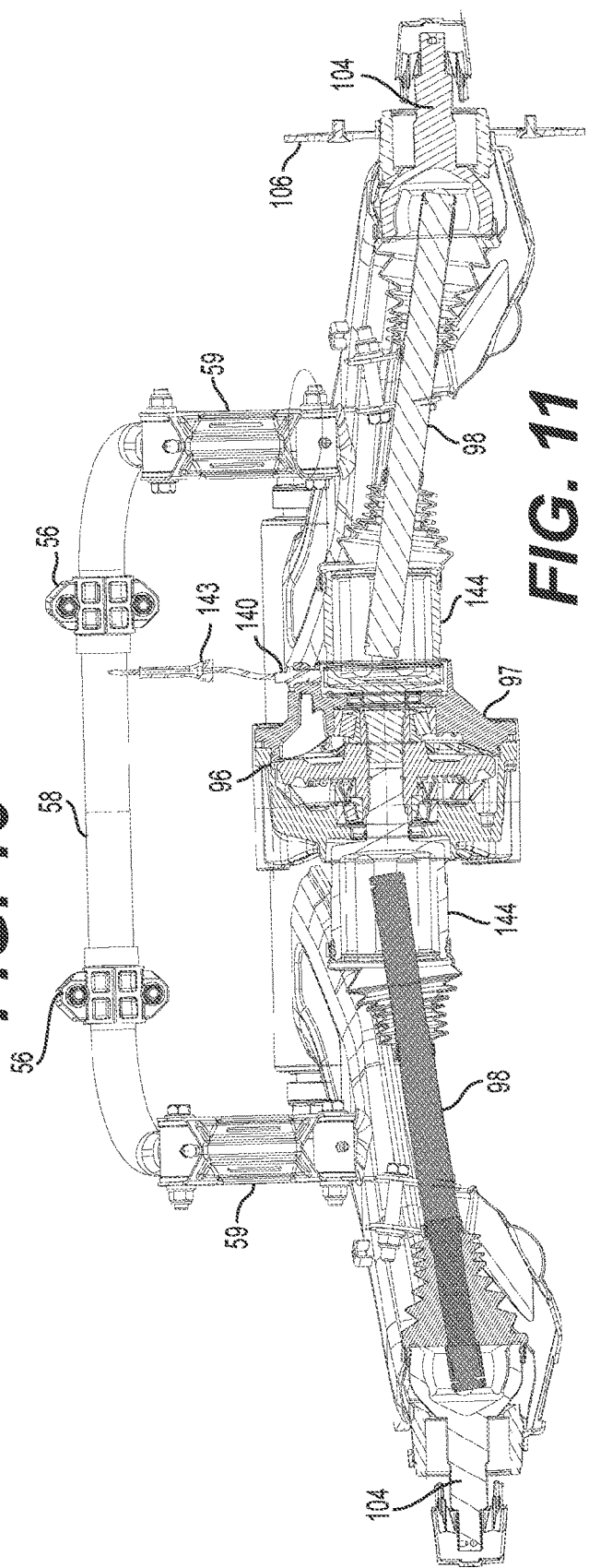

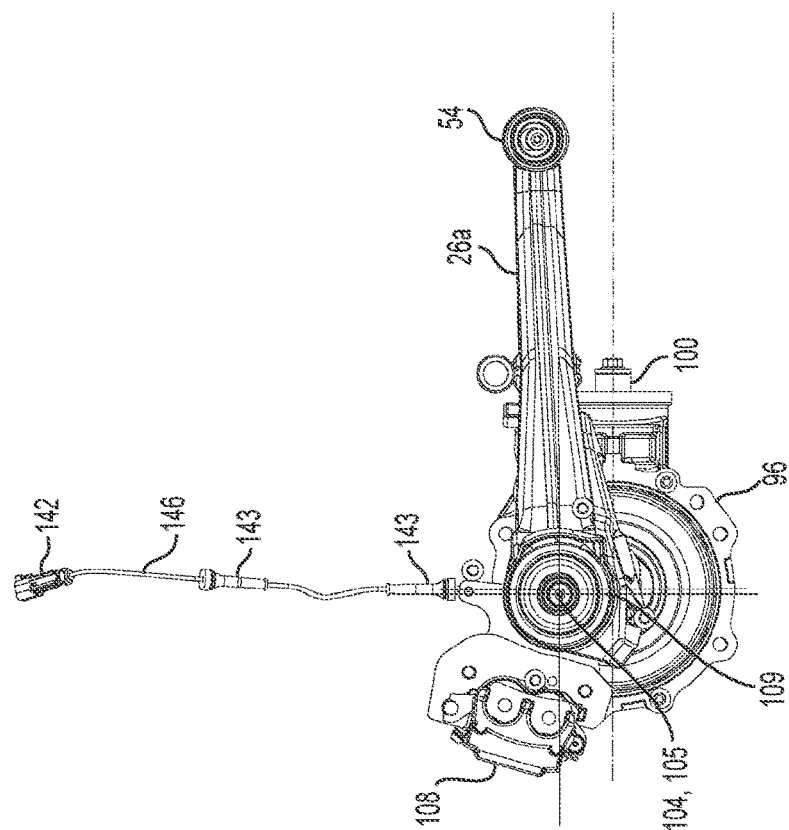
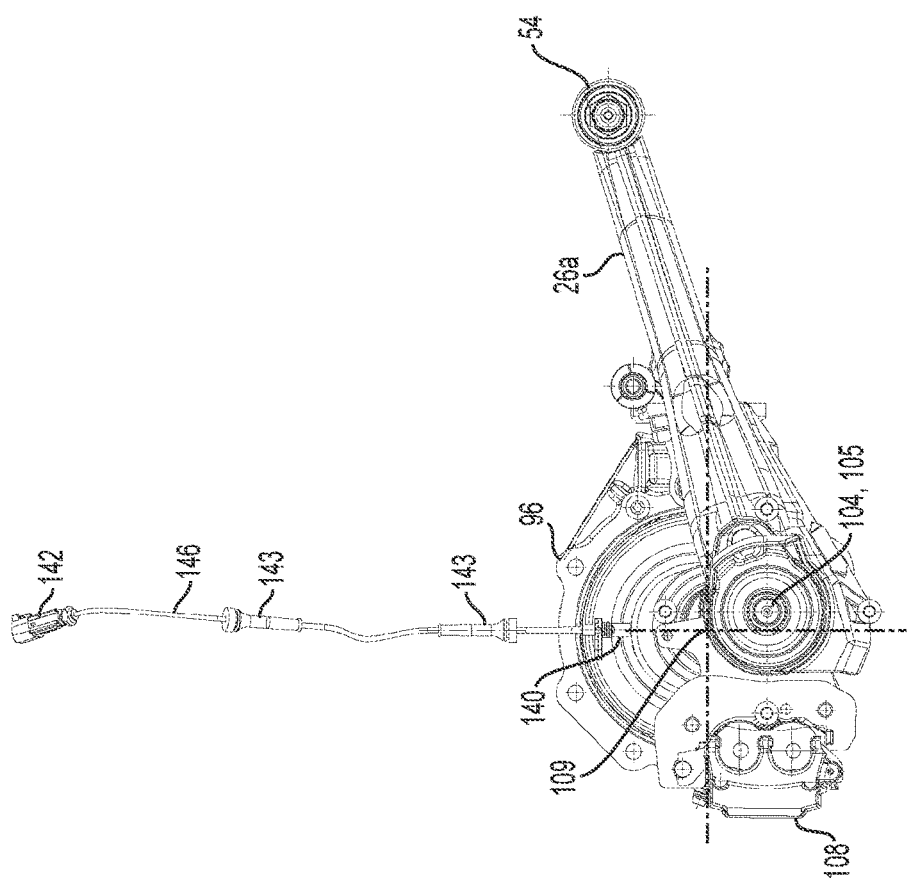
FIG. 12B
FIG. 12A

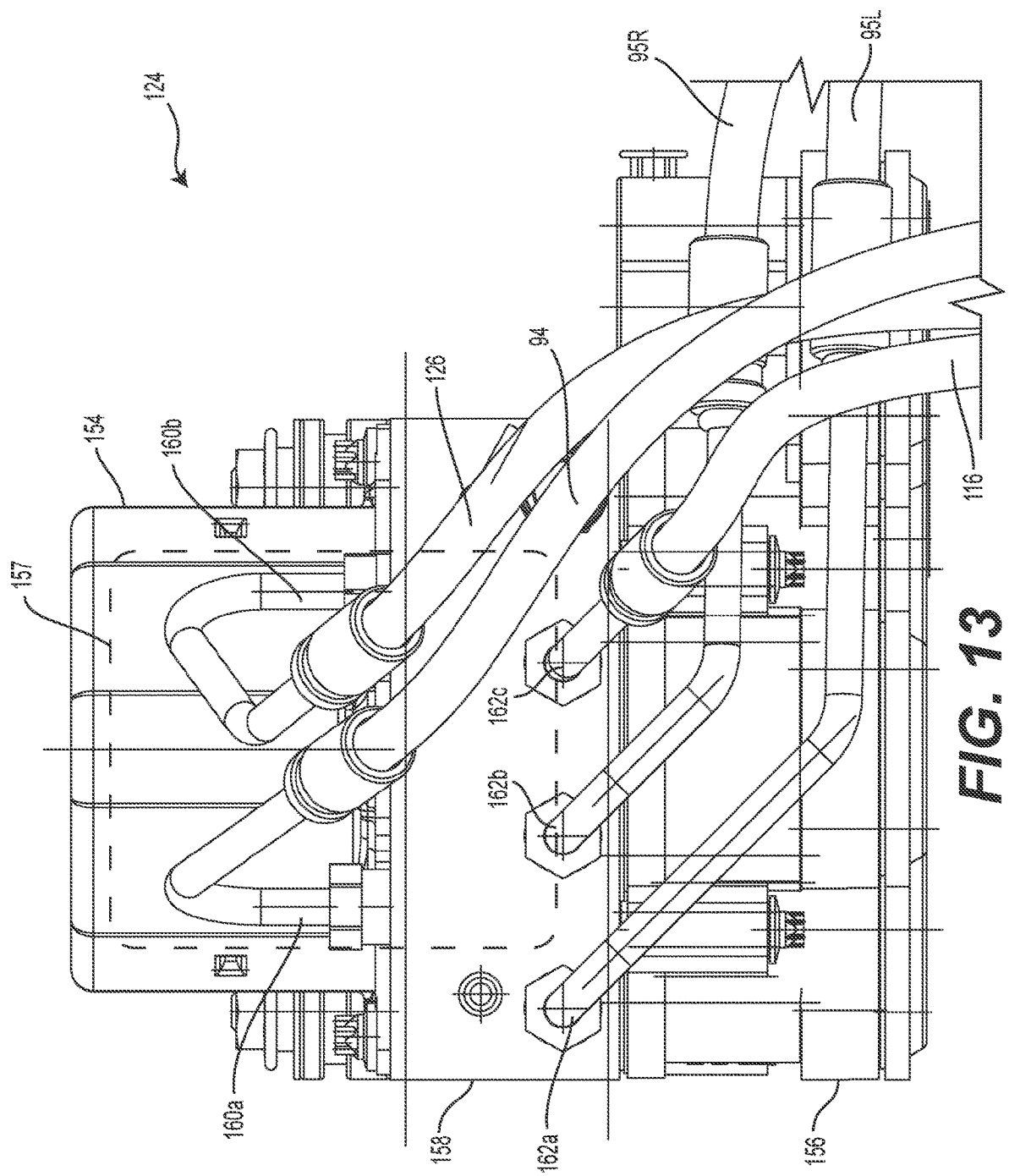

FOUR-WHEEL OFF-ROAD VEHICLE HAVING AN ANTI-LOCK BRAKING SYSTEM ASSEMBLY

CROSS-REFERENCE

The present application claims priority from United States Provisional Patent Application No. 62/598,797 filed on Dec. 14, 2017, the entirety of which being incorporated by reference herein.

TECHNOLOGICAL FIELD

The present technology relates to a four-wheel off-road vehicle having an anti-lock braking system assembly.

BACKGROUND

All-terrain vehicles (ATVs) and similar vehicles are used for utility and recreational purposes. Such ATVs are oftentimes equipped with a hand lever mounted on a handlebar for controlling front brakes and, in some cases, for further controlling rear brakes. A foot lever is used to control rear brakes.

Many road vehicles are equipped with anti-lock braking systems (ABS) designed to prevent locking of the wheels in slippery conditions. Such vehicles provide a brake assembly and a wheel speed sensor at each of the wheels of the vehicle. Braking components, in particular those of ABS systems, are expensive and add to the weight of a vehicle.

Thus, there is a desire for an ABS-equipped off-road wheeled vehicle that addresses the aforementioned drawbacks.

SUMMARY

It is an object of the present technology to ameliorate at least some of the inconveniences present in the prior art.

According to an aspect of the present technology, there is provided an off-road vehicle comprising: a frame; a motor connected to the frame; a left front wheel connected to the frame via a left front suspension assembly; a right front wheel connected to the frame via a right front suspension assembly; a left rear wheel connected to the frame via a left rear suspension assembly; a right rear wheel connected to the frame via a right rear suspension assembly; a rear spool gear operatively connecting the motor to the left and right rear wheels; a left rear half shaft operatively connecting the left rear wheel to the rear spool gear; a right rear half shaft operatively connecting the right rear wheel to the rear spool gear; a left front brake assembly operatively connected to the left front wheel; a right front brake assembly operatively connected to the right front wheel; a left front speed sensor adapted for sensing a speed of the left front wheel; a right front speed sensor adapted for sensing a speed of the right front wheel; a single rear brake assembly operatively connected to the left and right rear wheels; a single rear speed sensor adapted for sensing a speed of the left and right rear wheels; and a first user actuated braking input device and a second user braking input device, each of the first and second braking input devices being adapted for independently or jointly providing a braking command.

In some implementations of the present technology, the single rear speed sensor comprises an encoder mounted on one side of a housing of the rear spool gear and a sensed part mounted to a constant velocity joint connected to one side of the rear spool gear.

In some implementations of the present technology, each of the left and right front speed sensors comprises a slotted ring adapted for rotating with a respective one of the left and right front wheels and an encoder adapted for detecting a passing of each slot of the slotted ring and for providing a respective speed signal to the electronic controller; and the single rear speed sensor comprises a slotted ring adapted for rotating with the rear wheels and an encoder adapted for detecting a passing of each slot of the slotted ring and for providing a respective speed signal to the electronic controller.

In some implementations of the present technology, the first and second braking input devices comprise a hand lever and a foot lever.

In some implementations of the present technology, the vehicle further comprises a front differential operatively connecting the motor to the left and right front wheels; a left front half shaft operatively connecting the left front wheel to the front differential; and a right front half shaft operatively connecting the right front wheel to the front differential.

In some implementations of the present technology, the left and right front speed sensors each comprise an encoder mounted on respective left and right sides of a housing of the front differential and a sensed part respectively mounted to left and right constant velocity joints connected to left and right sides of the front differential.

In some implementations of the present technology, the left and right front suspension assemblies respectively comprise left and right front shock absorbers; the left front shock absorber is mounted between the left front brake assembly and the left front speed sensor; and the right front shock absorber being mounted between the right front brake assembly and the right front speed sensor.

In some implementations of the present technology, the left and right rear suspension assemblies respectively comprise left and right rear shock absorbers, the single rear speed sensor being mounted laterally between one of the left and right rear shock absorbers and the spool gear.

In some implementations of the present technology, the left and right rear suspension assemblies respectively further comprise left and right rear swing arms; each of the left and right swing arms has one end pivoting about a generally laterally extending axis to the frame and an opposite end on which a corresponding one of the left and right shock absorbers and a corresponding one of the left and right rear wheels are supported; each of the left and right rear suspension assemblies is movable between an uncompressed position and a compressed position; a rotation axis of each one of the left and right rear wheels is forward of the single rear speed sensor when a corresponding one of the left and right rear suspension assembly is in the uncompressed position; and the rotation axis of the one of the left and right rear wheels is rearward of the single rear speed sensor when the corresponding one of the left and right rear suspension assemblies is in the compressed position.

In some implementations of the present technology, the single rear brake assembly comprises a caliper mounted on one of the left and right rear suspension assemblies; and the caliper moves in relation to the single rear speed sensor with movements of the one of the left and right rear suspension assemblies.

In some implementations of the present technology, the vehicle further comprises a steering column connected to the frame and operatively connected to the left and right front wheels; and a handlebar mounted on the steering column for steering the left and right front wheels; wherein one of the first and second braking input device is mounted to the handlebar.

In some implementations of the present technology, the vehicle further comprises a hydraulic module fluidly connected to the first and second braking input devices, the left and right front brake assemblies and to the rear brake assembly, the hydraulic module being adapted for detecting the braking command; a hydraulic pump adapted for maintaining fluid pressure in the hydraulic module and an electronic controller operatively connected to the hydraulic module, to the left and right front speed sensors, to the single rear speed sensor, and to the hydraulic pump, the electronic controller being adapted for: (a) receiving the braking command from the hydraulic module, (b) causing the hydraulic module to selectively apply at least one of a first pressure on the left front brake assembly, a second pressure on the right front brake assembly and a third pressure on the rear brake assembly when the braking command is detected.

In some implementations of the present technology, the electronic controller is further adapted for: (c) detecting, based on a comparison of the speeds detected by the left front sensor, the right front sensor and the single rear speed sensor, a locking or an onset of locking of one of the left front brake assembly, the right front brake assembly and the rear brake assembly, and (d) causing the hydraulic module to selectively release or reduce one of the first, second and third pressure applied to the one of the left front brake assembly, the right front brake assembly and the rear brake assembly that is locked or at the onset of locking.

In some implementations of the present technology, the vehicle further comprises a steering column connected to the frame and operatively connected to the left and right front wheels; and a power steering electric motor operatively connected to the steering column and to the left and right front wheels, the power steering electric motor being mounted on the steering column so that the hydraulic pump and the power steering electric motor overlap at least partially in a vertical direction when viewed from a side of the vehicle.

In some implementations of the present technology, the electronic controller is further adapted for repeatedly releasing and re-applying the respective pressure to the one of the left front brake assembly, the right front brake assembly and the rear brake assembly that is locked or at the onset of locking.

In some implementations of the present technology, the first and second braking input devices comprise a hand lever and a foot lever, the vehicle further comprising: a front master cylinder operatively connected to the hand lever; a rear master cylinder operatively connected to the foot lever; a first hose fluidly connected between the front master cylinder and the hydraulic module, the front master cylinder being adapted for applying a fluid pressure in the first hose upon actuation of the hand lever to deliver the braking command from the hand lever to the hydraulic module; a second hose fluidly connected between the rear master cylinder and the hydraulic module, the rear master cylinder being adapted for applying a fluid pressure in the second hose upon actuation of the foot lever to deliver the braking command from the foot lever to the hydraulic module; a third hose fluidly connected between the hydraulic module and the left front brake assembly for applying the first pressure on the left brake assembly; a fourth hose fluidly connected between the hydraulic module and the right front brake assembly for applying the second pressure on the right brake assembly; and a fifth hose fluidly connected between the hydraulic module and the rear brake assembly for applying the third pressure on the rear brake assembly.

For purposes of the present application, terms related to spatial orientation when referring to a vehicle and components in relation to the vehicle, such as "forwardly", "rearwardly", "left", "right", "above" and "below", are as they would be understood by a driver of the vehicle sitting thereon in an upright driving position, with the vehicle steered straight-ahead.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIGS. 10 and 11 are cross-sectional views of the elements of FIG. 9 taken along lines 10-10 and 11-11 of FIG. 9, respectively;

FIGS. 12a, 12b, 12c and 12d are right side elevation views showing various positions of the right rear suspension and rear brake assembly of the vehicle of FIG. 1;

FIG. 13 is an enlarged top plan view of a braking control unit; and

DETAILED DESCRIPTION

Figure 1:
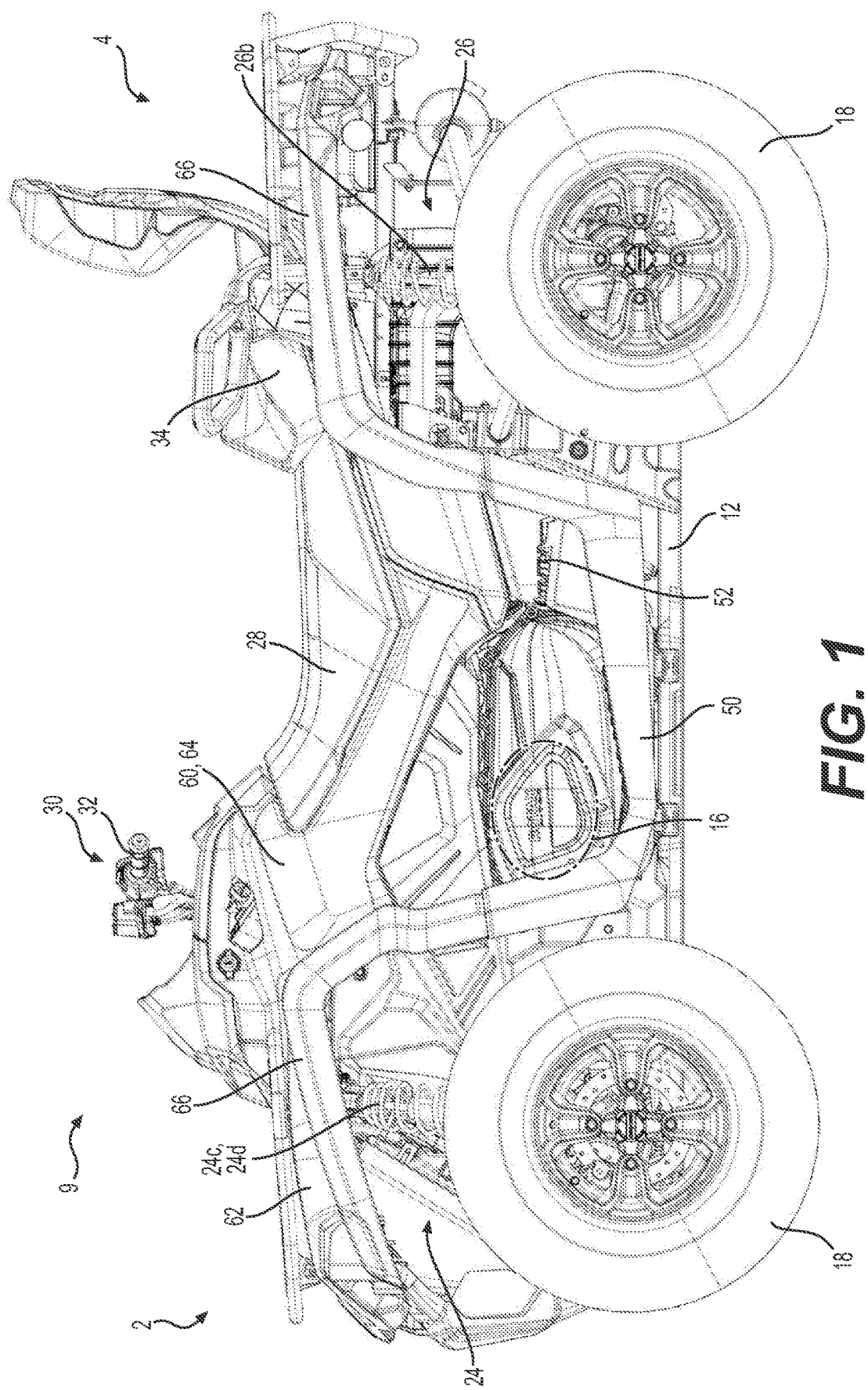
FIG. 1 is a left side elevation view of an all-terrain vehicle.

The present technology will be described with reference to a four-wheeled straddle-seat all-terrain vehicle (ATV) 9. However, it is contemplated that aspects of the present technology could be used in other types of four-wheeled vehicles, such as side-by-side vehicles, dune buggies, and the like, including all-wheel drive and rear-wheel drive vehicles.

With reference to FIGS. 1 to 6, the ATV 9 has a front end 2 and a rear end 4 defined consistently with a forward travel direction of the ATV 9. The ATV 9 has a frame 12 to which is mounted an internal combustion engine 16 for powering the ATV 9. It is contemplated that the ATV 9 may be powered by other types of motors, being for example powered by an electric motor.

The ATV 9 has two front wheels 18 and two rear wheels 18. The wheels 18 are operatively connected to the engine 16 via a transmission (not shown). Each of the four wheels 18 is provided with low-pressure balloon tires adapted for off-road conditions and traversing rugged terrain. It is contemplated that the ATV 9 could have only three wheels 18.

As illustrated on FIG. 1, the ATV 9 also includes fairings 60 including a front fascia 62 at the front end 2 of the ATV 9 and several side panels 64 extending over lateral sides of the ATV 9. A fender 66 is disposed over each wheel 18 to protect the driver and/or passenger from dirt, water and other debris being projected by the rotating wheels 18. The ATV 9 further includes a straddle-type driver seat 28 mounted to the frame 12 for accommodating a driver of the ATV 9. Driver footrests 50 are provided on either of the driver seat 28 and are disposed vertically lower than the driver seat 28 to support the driver's feet. Another straddle-type passenger seat 34 is provided behind the driver seat 28 to accommodate a passenger. A passenger footrest 52 is provided longitudinally rearward of each of the left and right driver footrests 50. The passenger footrests 52 are disposed slightly higher than the driver footrests 50 and designed to accommodate the feet of a passenger seated on the passenger seat 34 which is disposed slightly vertically higher than the driver seat 28. It is contemplated that passenger seat 34 and passenger footrests 52 could be omitted so ATV 9 would be recommended for a single driver in place of a driver and passenger.

The two front wheels 18 are suspended from the frame 12 by respective front suspension assemblies 24 while the two rear wheels 18 are suspended from the frame 12 by respective rear suspension assemblies 26.

Each front suspension assembly 24 includes an upper A-arm 24a, a lower A-arm 24b, a front shock absorber 24c and a front coil spring 24d. The front coil spring 24d is mounted over the front shock absorber 24c. The front coil spring 24d and the front shock absorber 24c are both pivotably connected at their lower ends to the upper A-arm 24a and at their upper ends to the frame 12. The upper and lower A-arms 24a and 24b each have one end pivotably connected to the frame 12, a kingpin 85 being mounted to each opposed ends of the upper and lower A-arms 24a and 24b. Each front wheel 18 is supported in part by a corresponding kingpin 85.

Each rear suspension assembly 26 comprises a swing arm 26a, a rear shock absorber 26b and a rear coil spring 26c. Each swing arm 26a has one end pivotably connected to the frame 12, about a pivot axis 54 located in front of the rear wheels 18 and extending generally laterally within the frame 12, and an opposite end supporting a wheel shaft 104 of its corresponding rear wheel 18. Each swing arm 26a is connected at mid-length to a torsion bar 58 by links 59. The torsion bar 58 is mounted to the frame 12 via supports 56. For each rear suspension assembly 26, the rear shock absorber 26b and the rear coil spring 26c each have one end pivotally connected to the frame 12 and the other end pivotally connected to its corresponding swing arm 26a near an opposed end thereof.

A steering assembly 30 is rotationally supported by the frame 12 to enable a driver to steer the ATV 9. The steering assembly 30 includes a handlebar 32 connected to a steering column 74 for actuating steering linkages 70 operably connected to left and right front wheels 18.

The ATV 9 can be operated in rear-wheel drive mode or in four-wheel drive mode. Its front end 2 includes a front differential 76 adapted to receive, via a driveshaft 80 a torque from the engine 16. On each of its left and right sides, the front differential 76 is connected to a constant velocity (CV) joint 134 (FIG. 8) connected to one end of a respective half shaft 78. Another CV joint 88 is connected to an opposed end of each half shaft 78. A wheel shaft 86 passing through and supported by a corresponding kingpin 85 is connected to each CV joint 88. A front wheel 18 and a front disc 82 are mounted to each wheel shaft 86. On each side of the front differential 76, the front wheel 18, the disc 82, the CV joint 88, the half shaft 78 and the CV joint 134 are operably connected to rotate together, at a common speed. The torque from the engine 16 is received at an input shaft 80 of the front differential 76 when the ATV 9 is in four-wheel drive mode. In turn, the differential 76 transmits the torque to the front wheels 18 via the CV joints 134, the front half shafts 78, the CV joints 88 and the wheel shafts 86. Depending on riding conditions of the ATV 9, the front differential 76 may send unequal torque to the two front wheels 18 so that the left front wheel 18 and the right front wheel 18 may rotate at different speeds. Left and right front brake assemblies include the discs 82 and further include calipers 84 mounted on the kingpins 85. The left and right front calipers 84 are respectively connected to hoses 95L and 95R. Each caliper 84 includes a pair of brake pads 87 positioned on opposite sides of the respective disc 82. Actuating the calipers 84 by application of a fluid pressure in the hoses 95L and/or 95R causes the brake pads 87 to apply pressure on the respective discs 82.

The ATV 9 includes a rear spool gear 96 enclosed within a housing 97. An input shaft 100 of the spool gear 96 is operably connected to a shaft 101 by a universal joint 99. The shaft 101 is connected by a universal joint 103 to the transmission to receive an input torque from the engine 16. On each of its left and right sides, the spool gear 96 is connected to a CV joint 144 (FIG. 10) connected to one end of a respective half shaft 98. Another CV joint 145 is connected to an opposed end of each half shaft 98. The CV joints 144 and 145 are protected by boot covers 102. A wheel shaft 104 passing through and supported by a lower end of a corresponding swing arm 26a is connected to each CV joint 145. A rear wheel 18 is mounted to each wheel shaft 104.

The spool gear 96 transmits the torque received from the engine 16 to the left and right rear wheels 18. The spool gear 96 causes the CV joints 144, the half shafts 98, the CV joints 145, the wheel shafts 104 and the rear wheels 18 located on both left and right sides of the ATV 9, as well as the single disc 106, to rotate together, at a common speed.

A single rear brake assembly includes a single disc 106 and a single caliper 108. Although the single disc 106 as illustrated is located on the right-hand side of the ATV 9, mounting the single disc 106 on the left-hand side of the ATV 9 is also contemplated. The single caliper 108 is supported by the right swing arm 26a. The single disc 106 is operatively connected to the right swing arm 26a via a bearing (not shown) for the right wheel shaft 104. The single caliper 108 is connected to a hose 116. The single caliper 108 includes a pair of brake pads 113 positioned on opposite sides of the single disc 106. Actuating the single caliper 108 by application of a fluid pressure in the hose 116 causes the brake pads 113 to apply pressure on the single disc 106. No rear brake assembly is present on the left-hand side of the ATV 9, where the left rear wheel 18 is supported by the left swing arm 26a.

A user of the ATV 9 may actuate either or both of two (2) user actuated braking input devices, for example a hand lever 90 and a foot lever 110, to independently or jointly deliver a braking command for slowing down or stopping the ATV 9. The hand lever 90 and a front master cylinder 92 are mounted on the handlebar 32. The front master cylinder 92 can be directly filled with braking oil. Actuating the hand lever 90 causes the front master cylinder 92 to transmit the braking command to a braking control unit 124. In the implementation as shown, the braking command from the hand lever 90 is in the form of a fluid pressure in a hose 94 connected between the front master cylinder 92 and the braking control unit 124. In another implementation, actuation of the hand lever 90 may cause the application of a tension on a cable to deliver the braking command to the braking control unit 124. An alternative implementation where the braking system is a brake-by-wire system in which the hand lever 90 delivers the braking command in the form of an electric or optical signal to the braking control unit 124 is also contemplated. The braking command is proportional (either linearly or non-linearly) to the force applied on the hand lever 90. When the hand lever 90 is actuated, a signal is sent for turning on brake lights (not shown).

The foot lever 110 and a rear master cylinder 112 are mounted on a bracket 114 supported by the lower portion of the frame 12. The rear master cylinder 112 receives braking oil via a hose 118 from a reservoir 120. Actuating the foot lever 110 causes the rear master cylinder 112 to exert a fluid pressure in a hose 126, also resulting in the delivery of the braking command to the braking control unit 124. As in the case of the hand lever 90, implementations of the foot lever 110 applying the braking command to the braking control unit 124 by the application of a tension on a cable or in the form of an electric or optical signal are also contemplated. The braking command is proportional (either linearly or non-linearly) to the force applied on the foot lever 110. When the foot lever 110 is actuated, a signal is sent for turning on the brake lights.

Figure 6:
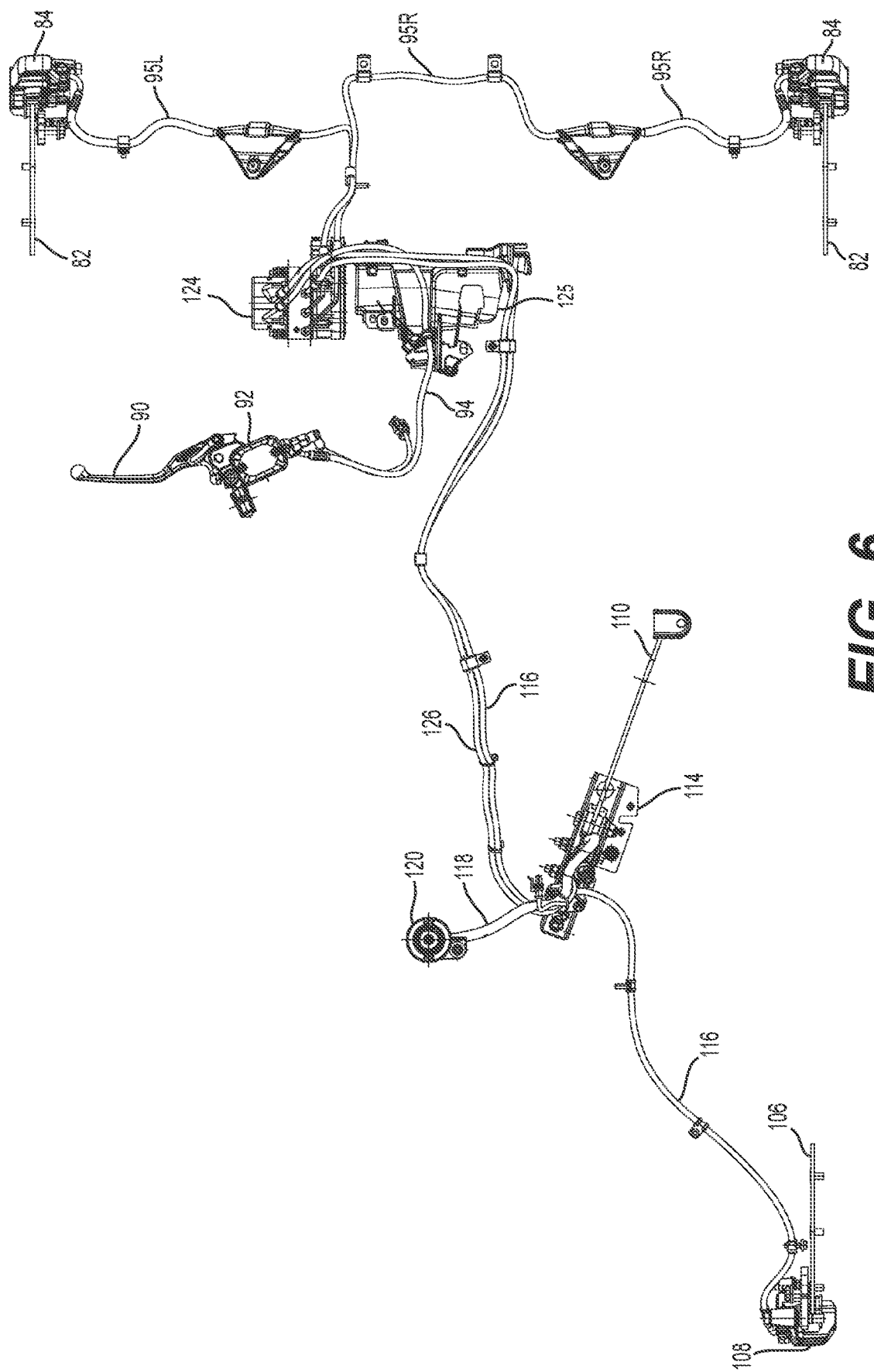
FIG. 6 is a top plan view of the anti-lock braking system assembly of the vehicle of FIG. 1.

The braking control unit 124 may receive the braking command from the front master cylinder 92, via the hose 94, or from the rear master cylinder 112, via the hose 126, or from both master cylinders 92 and 112. Referring at once to FIGS. 6 and 13, the braking control unit 124 includes a motor housing 154 that contains a motor (not shown) driving an internal hydraulic pump 157, an electronic controller 156 and a hydraulic module 158. The hydraulic module 158 includes fluidic input ports $160_a$ and $160_b$ for respectively connecting the hoses 94 and 126 that, in turn, are respectively connected to the hand lever 90 and to the foot lever 110. The hydraulic module 158 also includes fluidic output ports $162_a$, $162d_b$ and $162_c$ for respectively connecting the hoses 95L, 95R and 116 that, in turn, are respectively connected to the left front caliper 84, to the right front caliper 84 and to the single caliper 108. Sensors, which are described hereinbelow, are operatively connected to the electronic controller 156. The electronic controller 156 and the hydraulic pump 157 are energized by a battery 122 mounted above the input shaft 100, the shaft 101 and the universal joint 99. The battery 122 also energizes other electrical components of the ATV 9.

In operation, the hydraulic module 158 detects the braking command, including a level of the braking command, when pressure is present at one or both of the fluidic input ports $160_a$ and $160_b$. The hydraulic module 158 provides information about the braking command and about its level to the electronic controller 156. In turn, the electronic controller 156 causes the hydraulic module 158 to selectively open one or more of the fluidic output ports $162_a$, $162d_b$ and $162_c$ so that fluid pressure present in the hydraulic module 158 is selectively applied in one or more of the hoses 95L, 95R and 116. Applying pressure in the hoses 95L, 95R and/or 116 causes one or more of the corresponding left front caliper 84, right front caliper 84, and rear caliper 108 to selectively apply pressure on the corresponding left front disc 82, right front disc 82 and rear disc 106. Full or partial opening of the one or more of the fluidic output ports $162_a$, $162_b$ and $162_c$ is controlled by the electronic controller 156 so that braking forces in the various braking assemblies is proportional to the level of the braking command. The hydraulic pump 157 maintains an adequate fluid pressure in the hydraulic module 158 as the hydraulic module 158 opens and closes some of the fluidic output ports $162_a$, $162d_b$ and $162_c$.

The ATV 9 is equipped with an anti-lock braking system (ABS). Consequently, the electronic controller 156 causes the hydraulic module 158 to apply the first, second and third fluid pressures in the hoses 95L, 95R and 116, respectively, in a selective manner, depending at least in part on speed measurements for the front and rear wheels 18 of the ATV 9.

A bracket (not shown) mounted near the steering column 74 and the braking control unit 124 supports the various hoses 94, 95L, 95R, 116 and 126.

Figure 2:
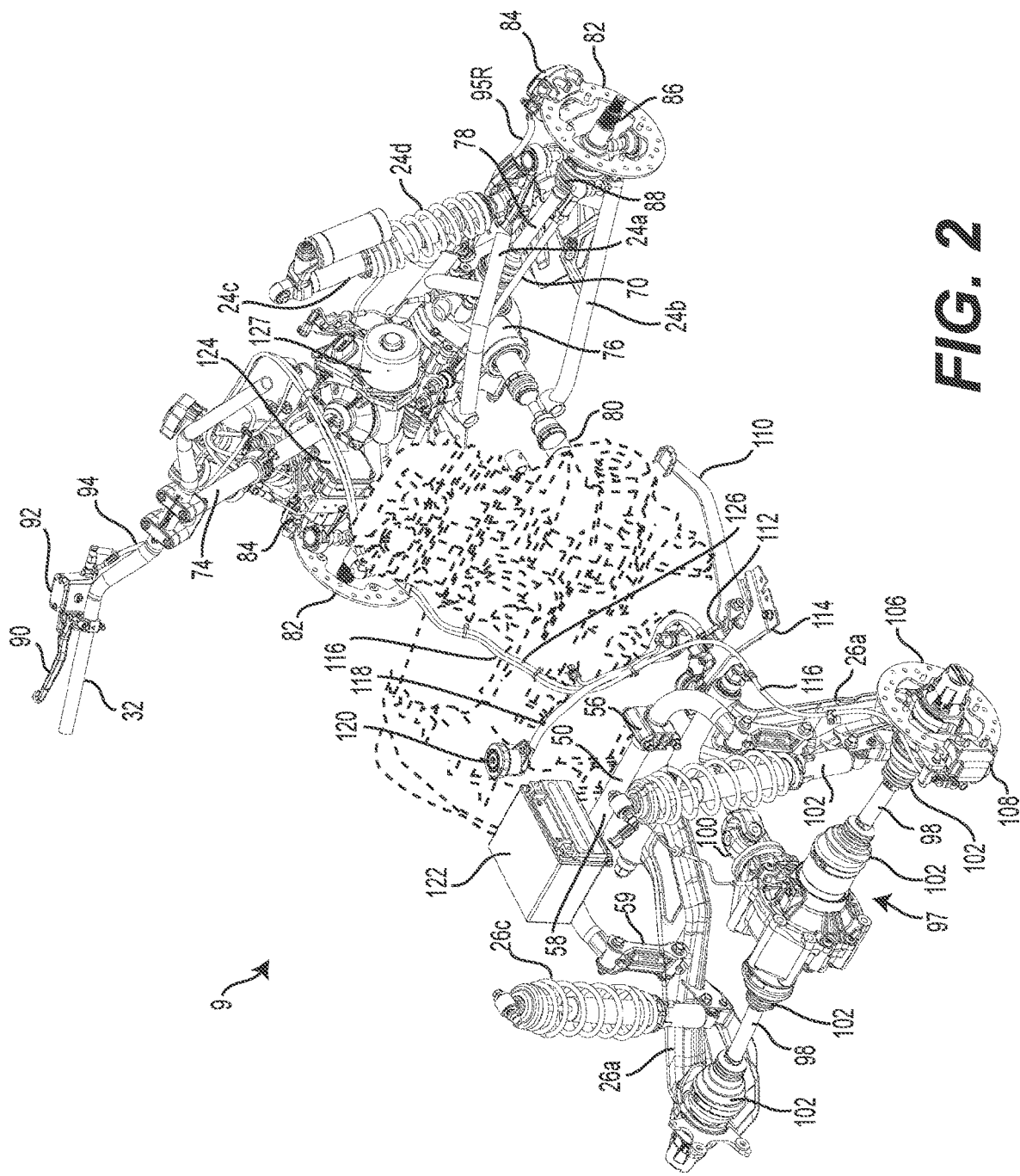
FIG. 2 is a perspective view, taken from a rear right side, of left and right front suspensions, left and right rear suspensions, left and right front brake assemblies, rear brake assemblies, and steering components of the vehicle of FIG. 1.
Figure 3:
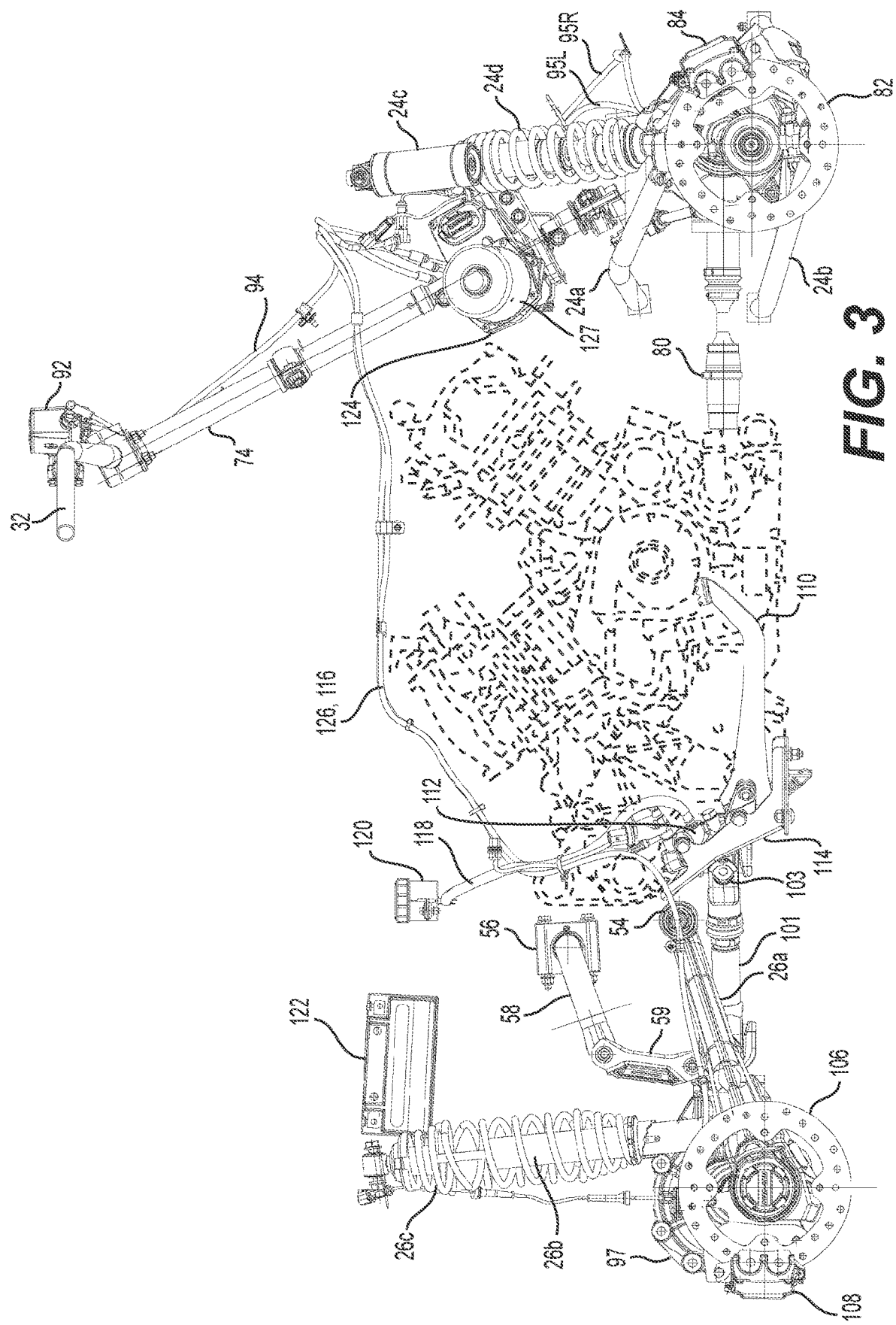
FIG. 3 is a right side elevation view of the components of FIG. 2.
Figure 4:
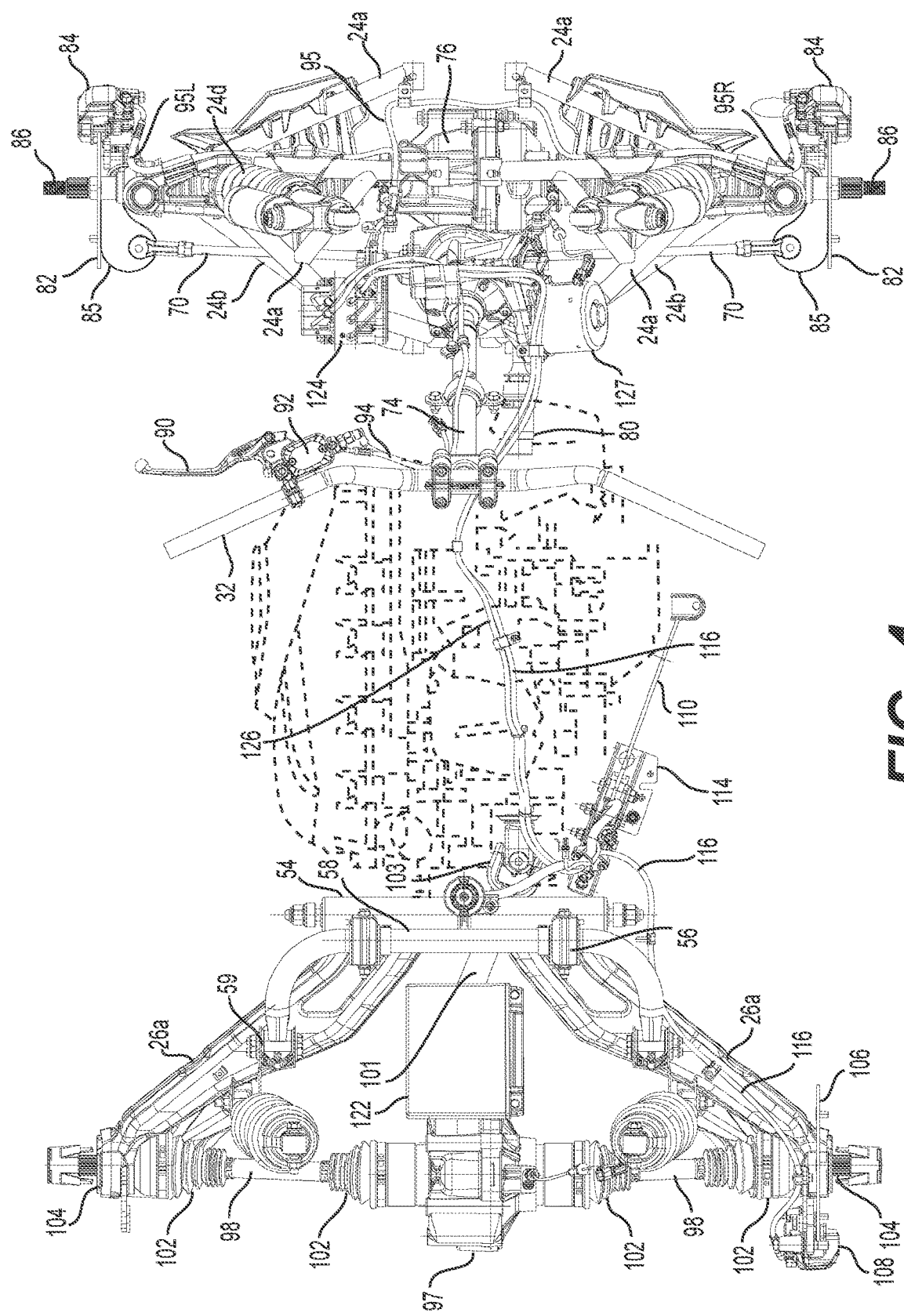
FIG. 4 is a top plan view of the components of FIG. 2.
Figure 5:
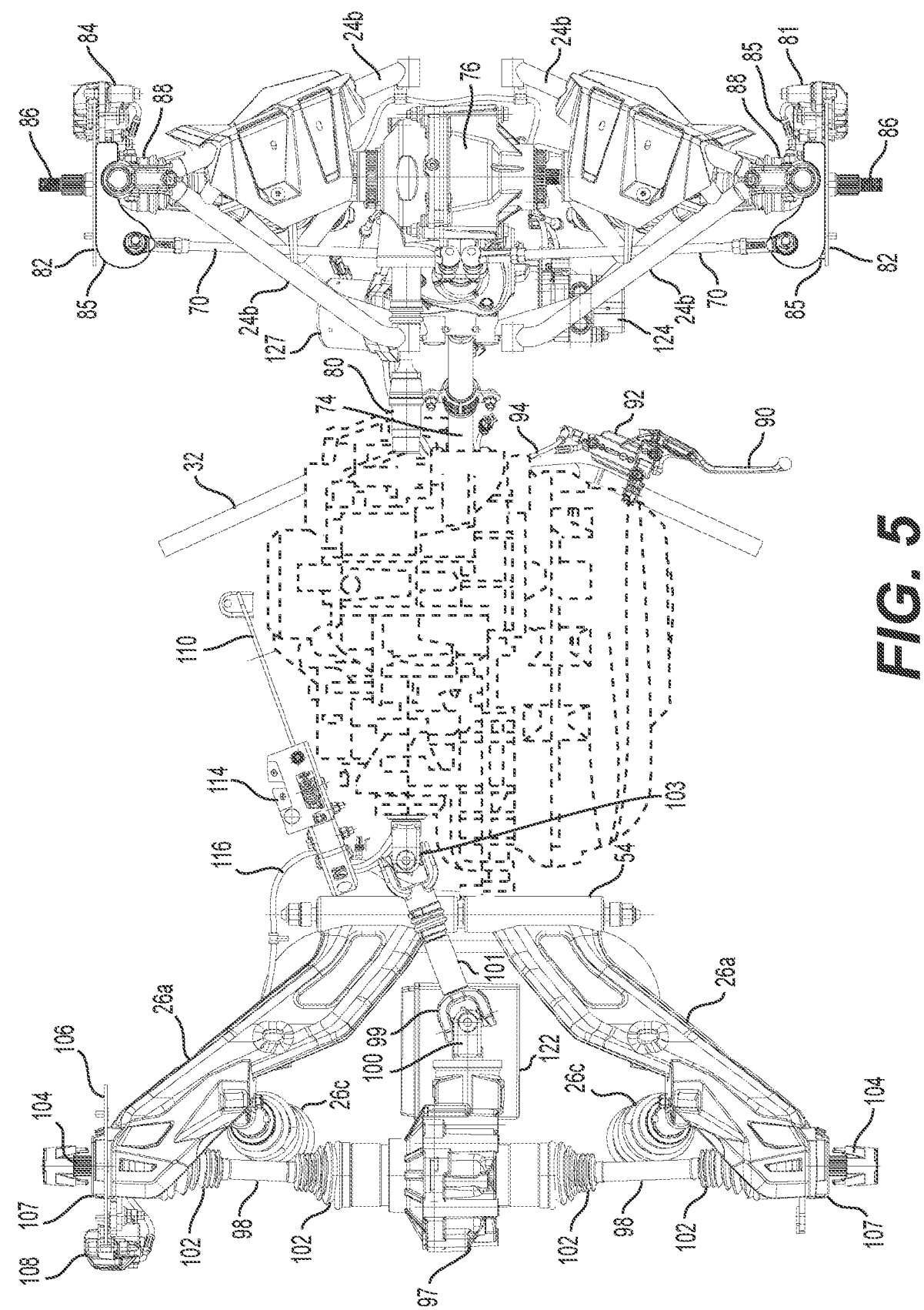
FIG. 5 is a bottom plan view of the components of FIG. 2.

Some variants of the present off-road vehicle may be equipped with power steering. FIGS. 2 and 3 show that the ATV 9 comprises a power steering electric motor 127 mounted to the steering column 74. The power steering electric motor 127 is operatively connected to the steering column 74 and to the left and right front wheels 18 via the steering linkages 70. In the implementation as illustrated, the power steering electric motor 127 and the braking control unit 124 are mounted proximate to one another so that the hydraulic pump 157 and the power steering electric motor 127 overlap at least partially in a vertical direction when viewed from a side of the ATV 9.

The ATV 9 includes other components such as a throttle operator, a gear shifter, an air intake system, an exhaust system, radiators, headlights, and the like. As it is believed that these components would be readily recognized by one of ordinary skill in the art, further explanation and description of these components will not be provided herein.

Figure 7:
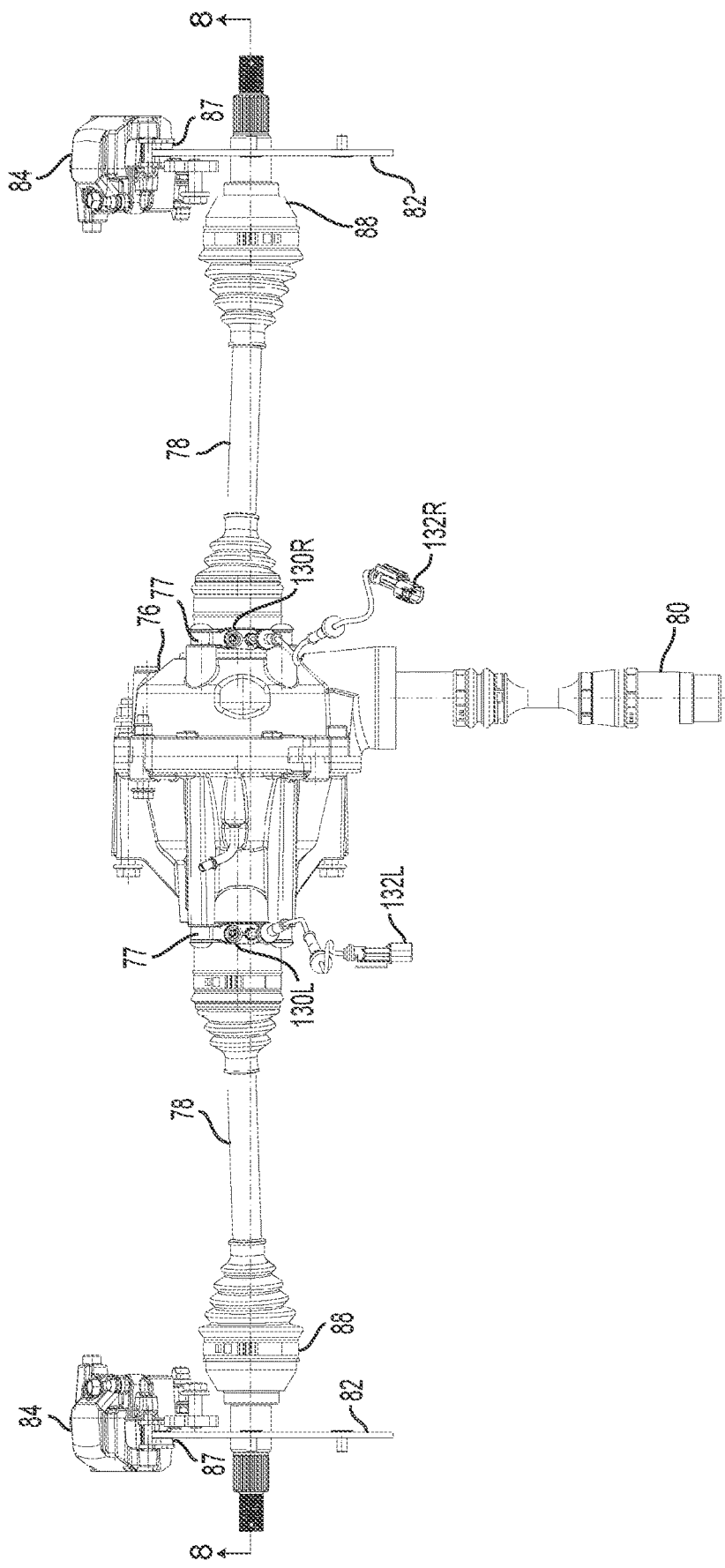
FIG. 7 is a top plan view of a front differential, left and right front half-shafts and left and right front braking assemblies of the vehicle of FIG. 1.
Figure 8:
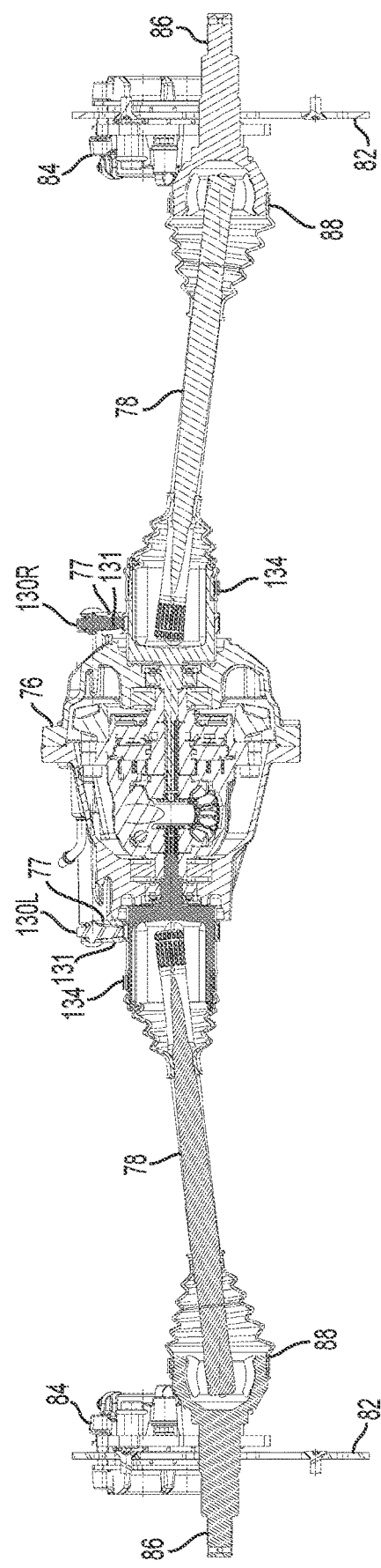
FIG. 8 is a cross-sectional view of the elements of FIG. 7 taken along line 8-8 of FIG. 7.
Figure 14:
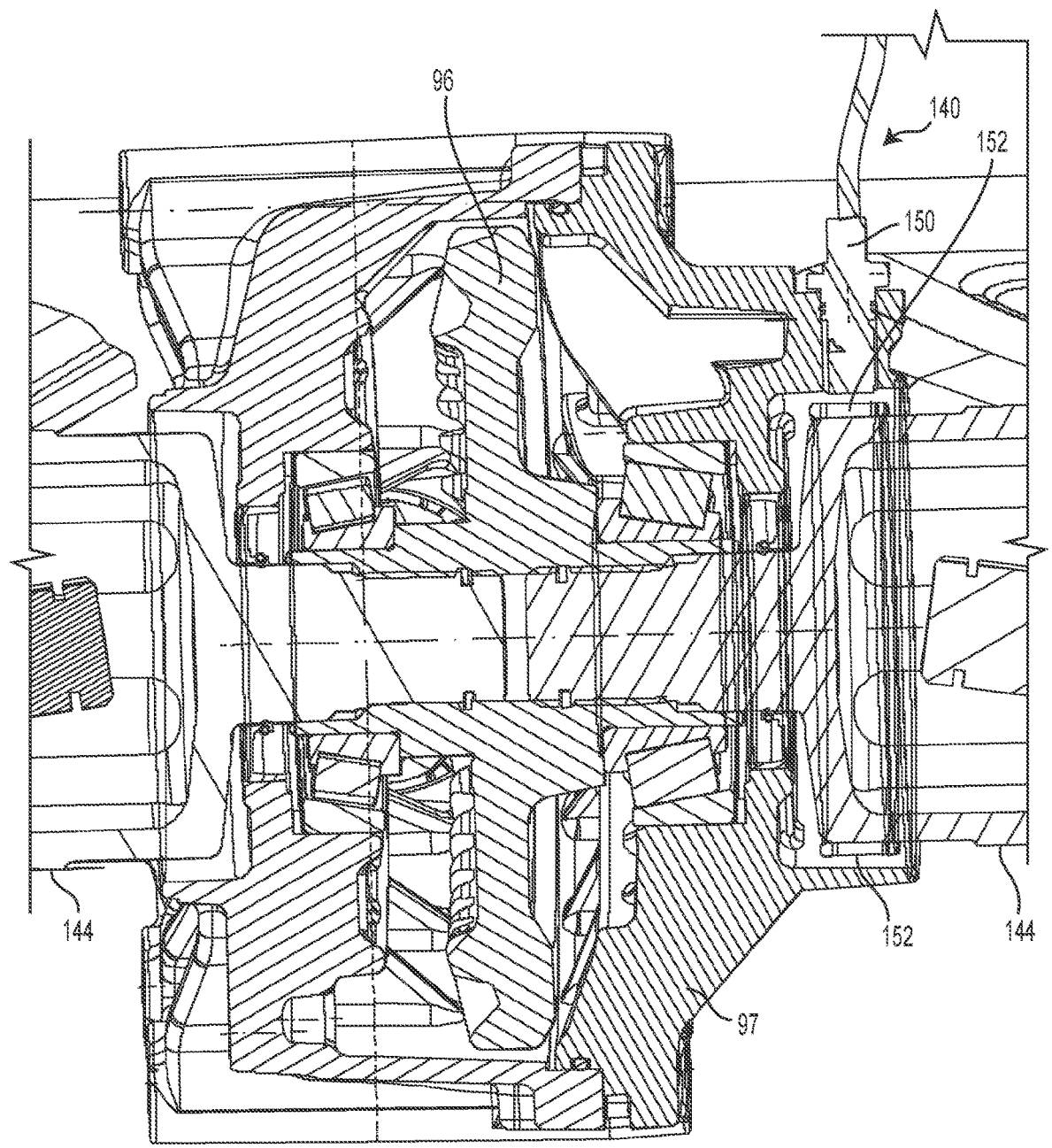
FIG. 14 is an enlarged view of parts of FIG. 10, showing details of a speed sensor.

Considering FIG. 7 and its cross-sectional view taken along lines 8-8 and shown on FIG. 8, front speed sensors 130L and 130R provide information about respective speeds of the left and right wheels 18 of the ATV 9. The front speed sensors 130L and 130R are positioned on left and right sides of the front differential 76. Each front speed sensor 130L and 130R comprises an encoder fixedly mounted on a respective bracket 77 mounted proximate to the right and left sides of the front differential 76, and a sensed part mounted to and rotating with respective CV joints 134 that connect the front differential 76 to the half shafts 78. An example of the encoder and of the sensed part is described hereinbelow (FIG. 14). Speed signals from the front speed sensors 130L are provided to the electronic controller 156 in the braking control unit 124 via respective connectors 132L and 132R.

In a variant, the sensed parts of the front speed sensors 130L and 130R may be mounted to any left and right component of the front end 2 that rotates with the left and right front wheels 18, the encoders of the front speed sensors 130L and 130R being mounted proximally to the sensed parts and support, for example on the left and right front suspension assemblies 24. Mounting the front speed sensors 130L and 130R at various points between each CV joint 134 of the front differential 76 and each front wheel 18 is thus contemplated. In the particular case of a rear-wheel drive vehicle in which the front end 2 does not include the front differential 76 and the front half shafts 78, the combination formed by the wheel shaft 86 and the front disc 82 on the left side of the vehicle rotates independently from the combination formed by the wheel shaft 86 and the front disc 82 on the right side of the vehicle, these combinations also rotating independently from the engine 16. On such vehicles, the front speed sensors 130L and 130R are mounted closer to the front wheels 18, for example being mounted to the wheel shafts 86.

Figure 9:
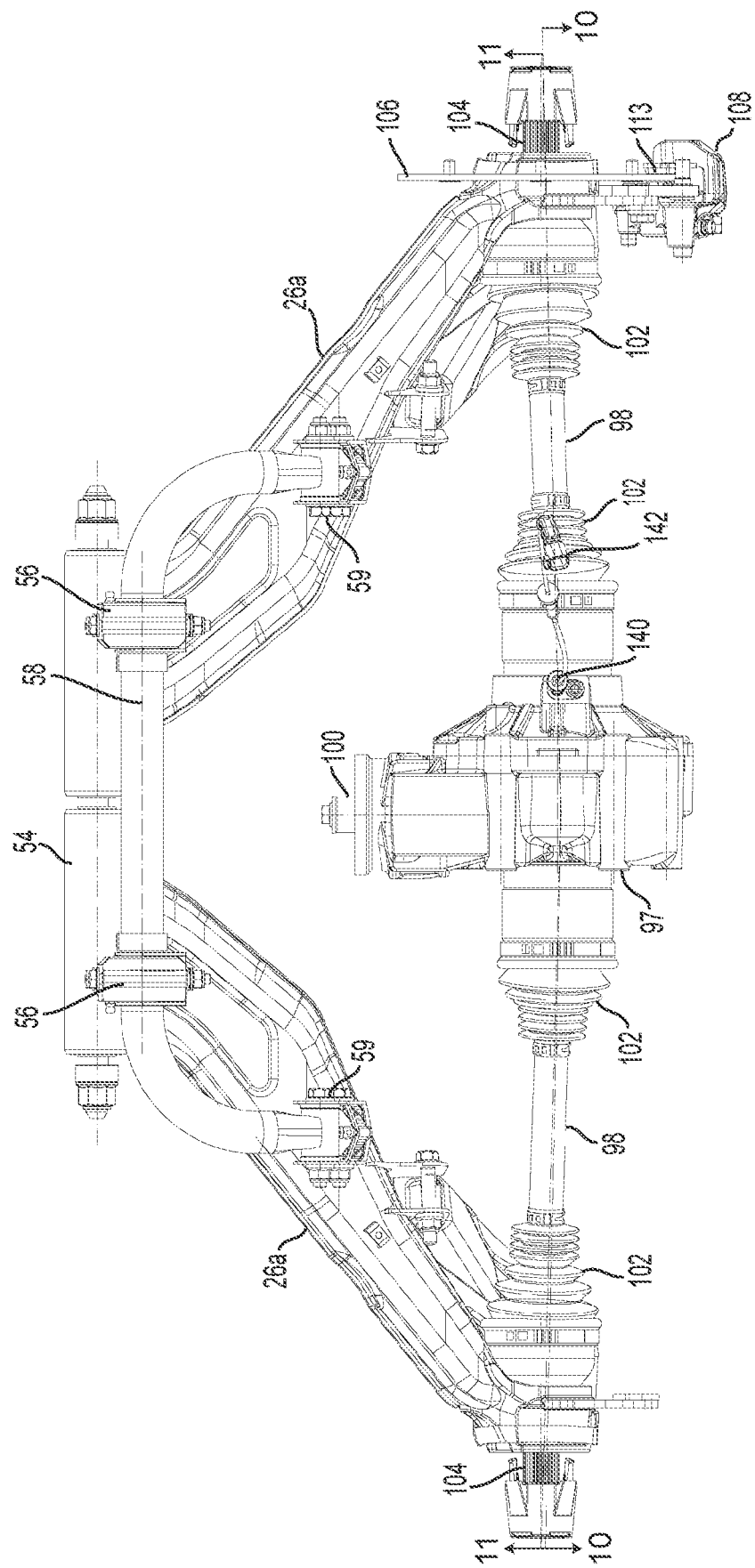
FIG. 9 is a top plan view of left and right rear suspensions, a rear spool gear, left and right rear half-shafts and a rear braking assembly of the vehicle of FIG. 1.

Both rear wheels 18 rotate at a same speed because they are connected to the spool gear 96. Turning now to FIG. 9 and its cross-sectional views taken along lines 10-10 and 11-11 and shown on FIGS. 10 and 11, respectively, a single rear speed sensor 140 provides information about the speed of the rear wheels 18 of the ATV 9. The rear speed sensor 140 provides this speed information in the form of speed signals to the electronic controller 156 of the braking control unit 124 via a wire 146 supported by a grommet 143. The rear speed sensor 140 comprises an encoder, fixedly mounted at an end of the housing 97 of the rear spool gear 96, and a sensed part mounted to and rotating with the right CV joint 144 that connects the spool gear 96 to the right half shaft 98. Although the rear speed sensor 140 is shown on the right side of the ATV 9, which is the same side on which the disc 106 and the caliper 108 are mounted, the rear speed sensor 140 could also be mounted on the left side. The rear speed sensor 140 and the rear brake assembly may thus be mounted on opposite sides of the spool gear 96. Mounting the rear speed sensor 140 at other points between the spool gear 96 and one of the wheels 18, at a point where the rear speed sensor 140 does not significantly move with movements of the rear left and right suspensions, is also contemplated. Mounting the rear speed sensor 140 further away from the spool gear 96, for example closer to one of the rear wheels 18, is further contemplated.

In an implementation, each of the front speed sensors 130L, 130R and rear speed sensor 140 share a similar construction, as such only the rear speed sensor 140 will be described in detail herein. Referring now to FIG. 14, the rear speed sensor 140 which is mounted near the rear spool gear 96 on the illustration comprises an encoder 150, mounted on the housing 97 of the rear spool gear 96, and a slotted ring 152 used as the sensed part of the rear speed sensor 140. The slotted ring 152 is mounted to the CV joint 144 near the housing 97 of the rear spool gear 96. The slotted ring 152 rotates with the CV joint 144 and with the half shafts 98. The encoder 150 detects the passing of each slot of the slotted ring 152, which rotates with the CV joint 144, and provides signals usable to determine the speed of the rear wheels 18.

In the braking control unit 124, the electronic controller 156 detects braking inputs from a user of the ATV 9 in the form of fluid pressure in the hose 94, when the hand lever 90 is actuated, or a fluid pressure in the hose 126, when the foot lever 110 is actuated, or both. The electronic controller 156 also receives the speed signals that provide wheel speed information for the left front wheel 18, the right front wheel 18, and the rear wheels 18, from the front speed sensors 130L, 130R and from the rear speed sensor 140, respectively. The electronic controller 156 compares the reported wheel speeds. When no brake locking is detected based on the comparison of the reported wheel speeds, the electronic controller 156 causes the hydraulic module 158 to direct pressure to the left and right front calipers 84 and to the rear caliper 108 for applying braking pressure on the left and right front discs 82 and on the rear disc 106. The pressure applied on the various calipers is in proportion to the braking command received from the hand lever 90 and/or foot lever 110. It is contemplated that the braking control 124 could direct pressure to only a subset of the calipers 84 and 108 for applying braking pressure on a corresponding subset of the discs 82 and 106. In an embodiment, which ones of the calipers 84 and 108 is part of the subset may be determined in proportion to the level of the braking command received from the hand lever 90 and/or foot lever 110. Alternatively, or in addition, the subset may be determined based on other signals received from vehicle operation condition sensors such as, but no limited to, pitch, roll and yaw sensors, and a drive mode sensor (two wheel drive/four wheel drive sensor, forward/reverse sensor). In another embodiment, the subset of the calipers 84, 108 that gets actuated may depend on which one of the hand lever 90 and the foot lever 110 gets actuated.

The electronic controller 156 detects the onset of locking (or actual locking) of one of the left and right front brake assemblies, or the onset of locking (or actual locking) of the rear brake assembly, when one of the front speed sensors 130L, 130R and the rear speed sensor 140 reports a significantly lower speed than the other ones of the front speed sensors 130L, 130R and the rear speed sensor 140. The electronic controller 156 causes the hydraulic module 158 to modulate the pressure applied by the corresponding caliper 84 or 108 on the disc 82 or 106 of the brake assembly that is locked or about to become locked, repeatedly closing and opening the corresponding fluidic output ports $162_a$, $162d_b$ and $162_c$ to repeatedly reduce or release and then re-apply pressure in the hoses 95L, 95R and/or 116 until the wheel (or wheels) 18 connected to the brake assembly that was about to become locked rotates again at about the same speed as the other wheels 18.

It is contemplated that, in the four-wheel drive mode, the electronic controller 156 may detect a loss of traction of one of the front wheels 18. One of the front speed sensors 130L and 130R reports a significantly higher speed than the other one of the front speed sensors 130L and 130R when the corresponding left or right front wheel 18 is slipping. To this end, the electronic controller 156 may detect that one of the front wheels 18 is slipping when it rotates faster than the other front wheel 18 by more than a predetermined threshold. In that event, the electronic controller 156 may cause the application of pressure by the caliper 84 on the disc 82 of the front brake assembly that corresponds to the slipping front wheel 18. This action causes the front differential 76 to transfer torque to the slower one of the front wheels 18. As in the case of ABS operation, the electronic controller 156 may modulate the pressure applied by the corresponding caliper 84 on the disc 82 of the front brake assembly of the slipping front wheel 18, repeatedly releasing and re-applying the pressure until the front wheel 18 connected to the brake assembly that was spinning gains traction, rotating again at about the same speed as the other front wheel 18.

In a variant, the electronic controller 156 may also receive other inputs from other systems of the ATV 9, reporting for example a steering angle, a transmission gear ratio, and the like.

Each of the left and right rear suspension assemblies 26 is movable between an uncompressed position and a compressed position. Referring now to FIGS. 12a, 12b, 12c and 12d, motions of the right rear suspension of the ATV 9 will now be described. FIGS. 12a-d show previously introduced components of the ATV 9 and further show the wire 146 supported by two grommets 143 and attached to a connector 142. An additional wire (not shown) attached to the connector 142 transmits signals from the rear speed sensor 140 to the electronic controller 156. The A-arm 24a of the right rear suspension pivots about the pivot axis 54 when the right rear suspension moves between the various views of FIGS. 12a-d. A position of the spool gear 96 in relation to the pivot axis 54 is not impacted by the movements of the right rear suspension.

Figure 12D:
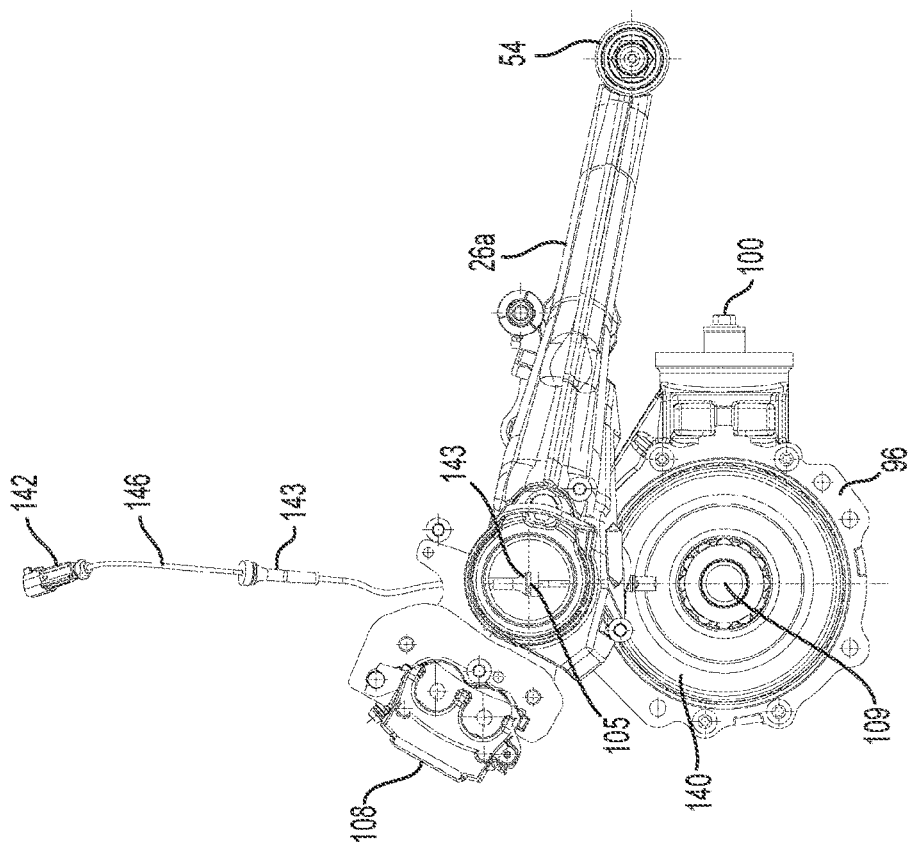
Figure 12C:
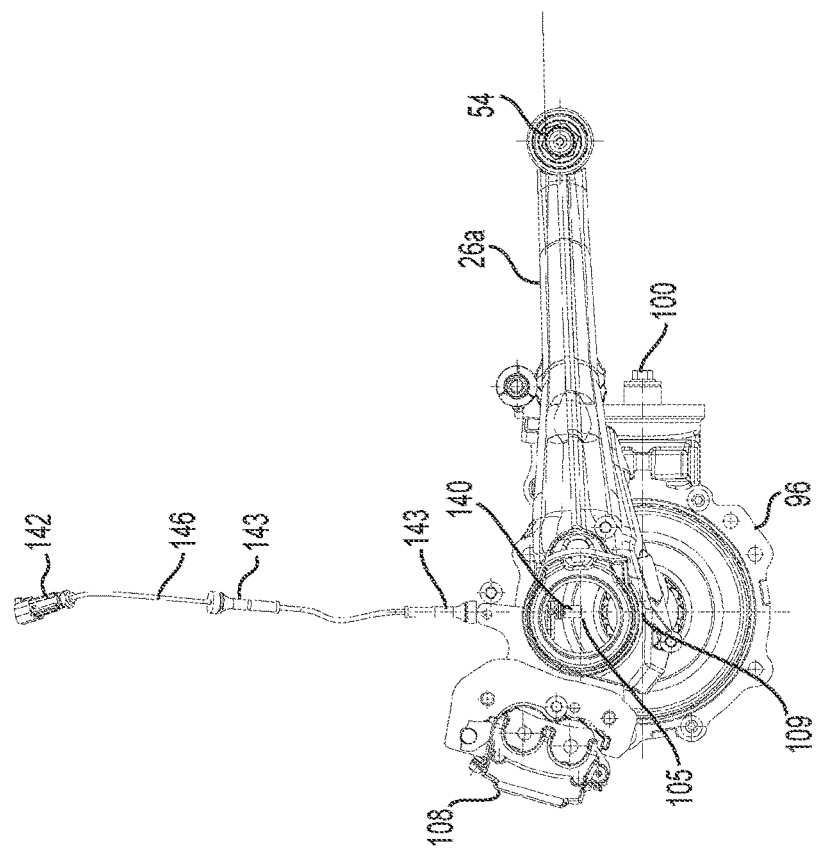

In FIG. 12a, the rear suspension is expanded. A rotation axis 105 of the right rear wheel 18, co-axial with the wheel shaft 104, is positioned lower than and forward of a central axis 109 of the spool gear 96. On FIG. 12b, the rear suspension is compressed. The rotation axis 105 of the right rear wheel 18 is higher than and rearward of the central axis 109 of the spool gear 96. On FIG. 12c, the rear suspension is compressed further. The central axis 109 of the right rear wheel 18 is still slightly rearward of the central axis 109 of the spool gear 96 and has moved to a higher position. On FIG. 12d, the rear suspension is heavily compressed. The rotation axis 105 of the right rear wheel 18 is now slightly forward of the central axis 109 of the spool gear 96 and has moved to an even higher position. In all positions of the right rear wheel 18, of the caliper 108, of the disc 106 (shown on earlier Figures) and in all corresponding movements of the rear suspension, the rear speed sensor 140, the connector 142 and the wire 146 remain substantially at unchanged positions. In particular, the rear speed sensor 140 remains substantially aligned with a central axis 109 of the rear spool gear 96 in FIGS. 12a to 12d. Mounting the rear speed sensor 140 on a part that does not move with the rear suspension assemblies 26, for example near the housing 97 of the rear spool gear 96 in the illustrated example, prevents wear and tear of these components that could occur if the rear speed sensor 140 was mounted to one of the rear wheels 18 or components that move with the compression and expansion of the suspension assemblies 26. The connector 142 and the wire 146 may however be protected using other techniques when positioned further away from the spool gear, for example using additional grommets (not shown) to maintain a minimum curvature radius of the wire 146.

Similarly, movement of the front suspension assemblies 24 is unlikely to cause wear and tear of the front speed sensors 130L and 130R, of the connectors 132L and 132R, and of wires connected thereto when the front speed sensors 130L and 130R are mounted to parts that do not move with the front suspension assemblies 24, for example near the front differential 76. The connectors 132L and 132R as well as the wires connected thereto may also be protected using other techniques when positioned closer to the front wheels 18.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. An off-road vehicle comprising:
a frame;
a motor connected to the frame;
a left front wheel connected to the frame via a left front suspension assembly;
a right front wheel connected to the frame via a right front suspension assembly;
a left rear wheel connected to the frame via a left rear suspension assembly;
a right rear wheel connected to the frame via a right rear suspension assembly;
a rear spool gear operatively connecting the motor to the left and right rear wheels;
a left rear half shaft operatively connecting the left rear wheel to the rear spool gear;
a right rear half shaft operatively connecting the right rear wheel to the rear spool gear;
a left front brake assembly operatively connected to the left front wheel;
a right front brake assembly operatively connected to the right front wheel;
a left front speed sensor adapted for sensing a speed of the left front wheel;
a right front speed sensor adapted for sensing a speed of the right front wheel;
a single rear brake assembly operatively connected to the left and right rear wheels;
a single rear speed sensor adapted for sensing a speed of the left and right rear wheels; and
a first user actuated braking input device and a second user braking input device, each of the first and second braking input devices being adapted for independently or jointly providing a braking command;
wherein:
the left and right rear suspension assemblies respectively comprise left and right rear shock absorbers, the single rear speed sensor being mounted laterally between one of the left and right rear shock absorbers and the rear spool gear;
the left and right rear suspension assemblies respectively further comprise left and right rear swing arms;
each of the left and right swing arms has one end pivoting about a generally laterally extending axis to the frame and an opposite end on which a corresponding one of the left and right shock absorbers and a corresponding one of the left and right rear wheels are supported;
each of the left and right rear suspension assemblies is movable between an uncompressed position and a compressed position;
a rotation axis of each one of the left and right rear wheels is forward of the single rear speed sensor when a corresponding one of the left and right rear suspension assemblies is in the uncompressed position; and
the rotation axis of the one of the left and right rear wheels is rearward of the single rear speed sensor when the corresponding one of the left and right rear suspension assemblies is in the compressed position.

2. The vehicle of claim 1, wherein the single rear speed sensor comprises an encoder mounted on one side of a housing of the rear spool gear and a sensed part mounted to a constant velocity joint connected to one side of the rear spool gear.

3. The vehicle of claim 1, wherein:
- each of the left and right front speed sensors comprises a slotted ring adapted for rotating with a respective one of the left and right front wheels and an encoder adapted for detecting a passing of each slot of the slotted ring and for providing a respective speed signal to an electronic controller; and
- the single rear speed sensor comprises a slotted ring adapted for rotating with the rear wheels and an encoder adapted for detecting a passing of each slot of the slotted ring and for providing a respective speed signal to the electronic controller.

4. The vehicle of claim 1, wherein the first and second braking input devices comprise a hand lever and a foot lever.

5. The vehicle of claim 1, further comprising:
- a front differential operatively connecting the motor to the left and right front wheels;
- a left front half shaft operatively connecting the left front wheel to the front differential; and
- a right front half shaft operatively connecting the right front wheel to the front differential.

6. The vehicle of claim 5, wherein the left and right front speed sensors each comprise an encoder mounted on respective left and right sides of a housing of the front differential and a sensed part respectively mounted to left and right constant velocity joints connected to left and right sides of the front differential.

7. The vehicle of claim 6, wherein:
- the left and right front suspension assemblies respectively comprise left and right front shock absorbers;
- the left front shock absorber is mounted between the left front brake assembly and the left front speed sensor; and
- the right front shock absorber being mounted between the right front brake assembly and the right front speed sensor.

8. The vehicle of claim 1, wherein:
- the single rear brake assembly comprises a caliper mounted on one of the left and right rear suspension assemblies; and
- the caliper moves in relation to the single rear speed sensor with movements of the one of the left and right rear suspension assemblies.

9. The vehicle of claim 1, further comprising:
- a steering column connected to the frame and operatively connected to the left and right front wheels; and
- a handlebar mounted on the steering column for steering the left and right front wheels;
- wherein one of the first and second braking input device is mounted to the handlebar.

10. The vehicle of claim 1, further comprising:
- a hydraulic module fluidly connected to the first and second braking input devices, the left and right front brake assemblies and to the rear brake assembly, the hydraulic module being adapted for detecting the braking command;
- a hydraulic pump adapted for maintaining fluid pressure in the hydraulic module; and
- an electronic controller operatively connected to the hydraulic module, to the left and right front speed sensors, to the single rear speed sensor, and to the hydraulic pump, the electronic controller being adapted for:
  - (a) receiving the braking command from the hydraulic module,
  - (b) causing the hydraulic module to selectively apply at least one of a first pressure on the left front brake assembly, a second pressure on the right front brake assembly and a third pressure on the rear brake assembly when the braking command is detected.

11. The vehicle of claim 10, wherein the electronic controller is further adapted for:
- (c) detecting, based on a comparison of the speeds detected by the left front sensor, the right front sensor and the single rear speed sensor, a locking or an onset of locking of one of the left front brake assembly, the right front brake assembly and the rear brake assembly, and
- (d) causing the hydraulic module to selectively release or reduce one of the first, second and third pressure applied to the one of the left front brake assembly, the right front brake assembly and the rear brake assembly that is locked or at the onset of locking.

12. An off-road vehicle comprising:
- a frame;
- a motor connected to the frame;
- a left front wheel connected to the frame via a left front suspension assembly;
- a right front wheel connected to the frame via a right front suspension assembly;
- a left rear wheel connected to the frame via a left rear suspension assembly;
- a right rear wheel connected to the frame via a right rear suspension assembly;
- a rear spool gear operatively connecting the motor to the left and right rear wheels;
- a left rear half shaft operatively connecting the left rear wheel to the rear spool gear;
- a right rear half shaft operatively connecting the right rear wheel to the rear spool gear;
- a left front brake assembly operatively connected to the left front wheel;
- a right front brake assembly operatively connected to the right front wheel;
- a left front speed sensor adapted for sensing a speed of the left front wheel;
- a right front speed sensor adapted for sensing a speed of the right front wheel;
- a single rear brake assembly operatively connected to the left and right rear wheels;
- a single rear speed sensor adapted for sensing a speed of the left and right rear wheels;
- a first user actuated braking input device and a second user braking input device, each of the first and second braking input devices being adapted for independently or jointly providing a braking command;
- a hydraulic module fluidly connected to the first and second braking input devices, the left and right front brake assemblies and to the rear brake assembly, the hydraulic module being adapted for detecting the braking command;
- a hydraulic pump adapted for maintaining fluid pressure in the hydraulic module;
- a steering column connected to the frame and operatively connected to the left and right front wheels; and
- a power steering electric motor operatively connected to the steering column and to the left and right front wheels, the power steering electric motor being mounted on the steering column so that the hydraulic pump and the power steering electric motor overlap at least partially in a vertical direction when viewed from a side of the vehicle.

13. The vehicle of claim 12, wherein the first and second braking input devices comprise a hand lever and a foot lever, the vehicle further comprising:
- a front master cylinder operatively connected to the hand lever;
- a rear master cylinder operatively connected to the foot lever;
- a first hose fluidly connected between the front master cylinder and the hydraulic module, the front master cylinder being adapted for applying a fluid pressure in the first hose upon actuation of the hand lever to deliver the braking command from the hand lever to the hydraulic module;
- a second hose fluidly connected between the rear master cylinder and the hydraulic module, the rear master cylinder being adapted for applying a fluid pressure in the second hose upon actuation of the foot lever to deliver the braking command from the foot lever to the hydraulic module;
- a third hose fluidly connected between the hydraulic module and the left front brake assembly for applying the first pressure on the left brake assembly;
- a fourth hose fluidly connected between the hydraulic module and the right front brake assembly for applying the second pressure on the right brake assembly; and
- a fifth hose fluidly connected between the hydraulic module and the rear brake assembly for applying the third pressure on the rear brake assembly.

14. The vehicle of claim 12, further comprising:
- an electronic controller operatively connected to the hydraulic module, to the left and right front speed sensors, to the single rear speed sensor, and to the hydraulic pump, the electronic controller being adapted for:
  - (a) receiving the braking command from the hydraulic module,
  - (b) causing the hydraulic module to selectively apply at least one of a first pressure on the left front brake assembly, a second pressure on the right front brake assembly and a third pressure on the rear brake assembly when the braking command is detected.

15. The vehicle of claim 14, wherein the electronic controller is further adapted for repeatedly releasing and re-applying the respective pressure to the one of the left front brake assembly, the right front brake assembly and the rear brake assembly that is locked or at the onset of locking.

* * * * *